United States Patent [19]

McGauran et al.

[11] 4,233,878
[45] Nov. 18, 1980

[54] BARB AND METHOD OF MAKING SAME

[75] Inventors: Hugh K. McGauran, Harlow; Leonard Saunders, Hatfield, both of England

[73] Assignee: Aerpat A.G., Zug, Switzerland

[21] Appl. No.: 927,912

[22] Filed: Jul. 25, 1978

[30] Foreign Application Priority Data

Jul. 29, 1977 [GB] United Kingdom ............... 31939/77

[51] Int. Cl.² ............................................. F16B 19/00
[52] U.S. Cl. ....................................... 85/7; 24/217 R
[58] Field of Search ................... 85/7, 5 R, 21, 36, 8.8, 85/1 JP, 4, 39; 72/90, 88, 89; 24/217, 216, 208 A, 73 P, 73 PF; 151/22

[56] References Cited

U.S. PATENT DOCUMENTS

| 2,126,585 | 8/1938 | Stone | 85/21 |
|---|---|---|---|
| 2,172,553 | 9/1939 | Tripp | 85/21 |
| 2,785,453 | 3/1957 | Wentz | 85/8.8 UX |
| 2,926,409 | 1/1960 | Perry | 24/217 |
| 3,009,381 | 11/1961 | Rapata | 85/7 |
| 3,196,529 | 7/1965 | Schwinghamer | 85/R X |
| 3,238,835 | 3/1966 | Rosenberg | 85/7 |
| 3,251,260 | 5/1966 | Serdechny | 85/7 |
| 3,276,308 | 10/1966 | Bergere | 85/72 |
| 3,295,404 | 1/1967 | Baker | 85/7 |
| 3,320,712 | 5/1967 | Rapata | 85/5 R X |
| 3,357,204 | 12/1967 | Davis | 24/217 X |
| 3,367,228 | 2/1968 | King, Jr. | 85/7 |
| 3,369,289 | 2/1968 | Gapp | 85/72 X |
| 3,641,865 | 2/1972 | Swindt et al. | 85/7 |
| 3,702,088 | 11/1972 | Schmitt | 85/77 |
| 3,736,834 | 6/1973 | MacDonald | 85/7 |
| 3,779,127 | 12/1973 | Speakman | 85/7 |
| 3,850,215 | 11/1974 | Orlomoski | 151/22 |
| 3,882,917 | 5/1975 | Orlomoski | 151/22 |
| 3,938,587 | 2/1976 | Vian | 85/7 X |
| 4,138,921 | 2/1979 | McGauran et al. | 85/7 |

FOREIGN PATENT DOCUMENTS

| 651985 | 11/1962 | Canada | 85/7 |
|---|---|---|---|
| 1350099 | 12/1963 | France | 85/8.8 |
| 204377 | 9/1965 | Sweden | 85/7 |
| 820917 | 9/1959 | United Kingdom | 85/1 JP |
| 881680 | 11/1961 | United Kingdom | 85/1 JP |

*Primary Examiner*—Ramon S. Britts
*Attorney, Agent, or Firm*—Oblon, Fisher, Spivak, McClelland & Maier

[57] ABSTRACT

A barb for engagement with a body 13 of deformable material such as nylon has a sharp edge 28 at the top of a relatively steep face 29 forming one side of a trough 32. A ledge or rim 38 projects from the face 29, about halfway up the face 29, and provides an abutment which restricts the extent to which the deformable material can enter the trough. This improves the resistance of the barb against being pulled out of the trough. This form of barb is particularly applicable to fasteners of the type in which a threadless bolt having barbs is embedded in a shell carrying a nylon sleeve.

The barb is manufactured by a rolling process in which two dies are successively applied to a cylindrical blank, the first die to form the trough 32, and the second die to form the ledge 38.

14 Claims, 14 Drawing Figures

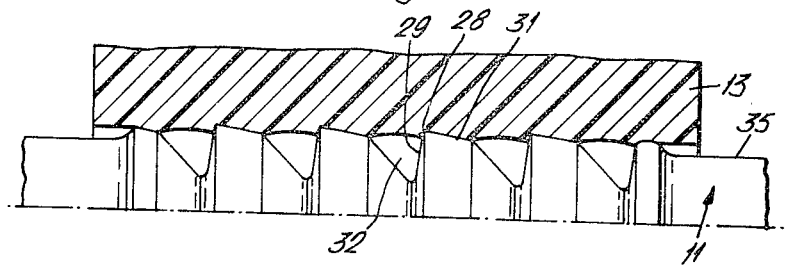
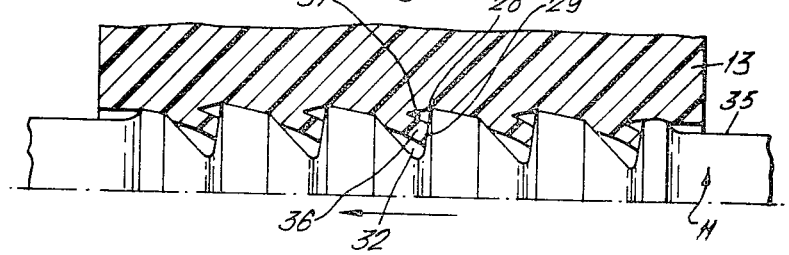
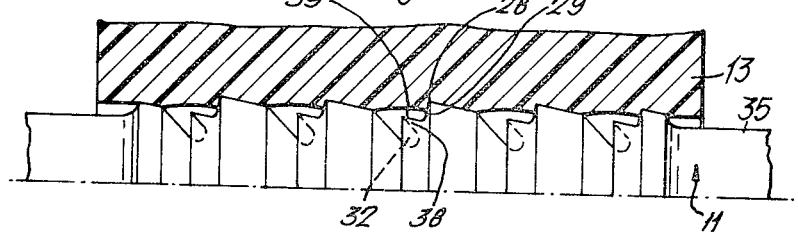
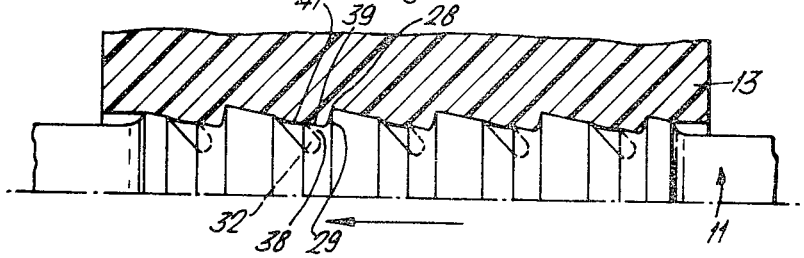

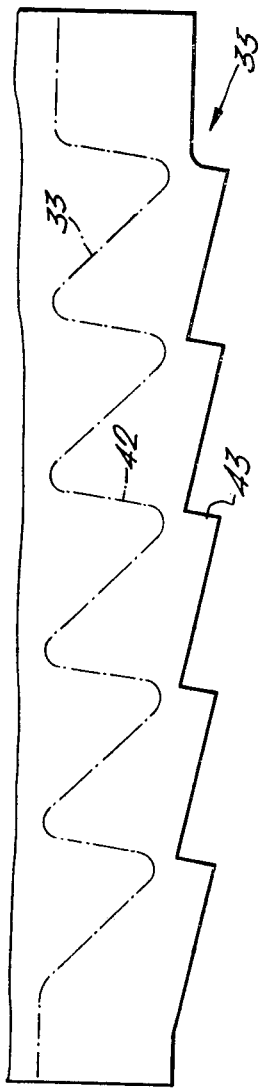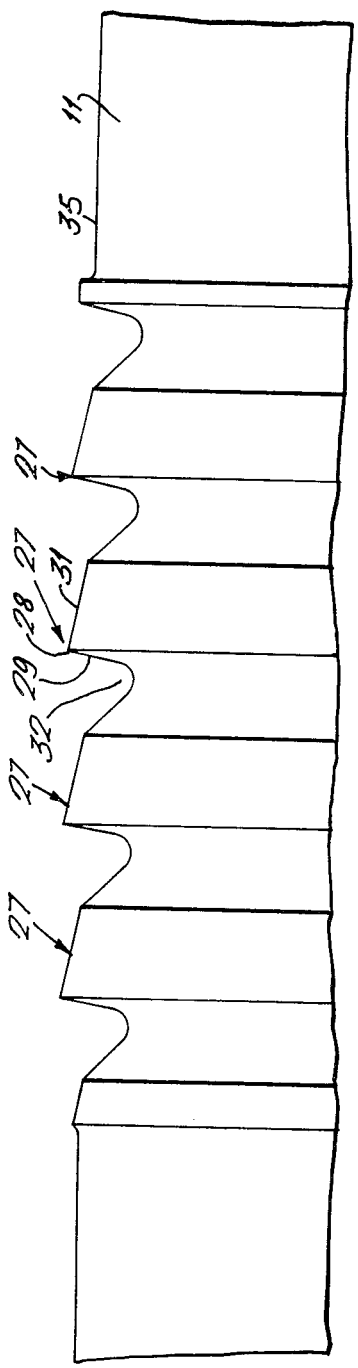

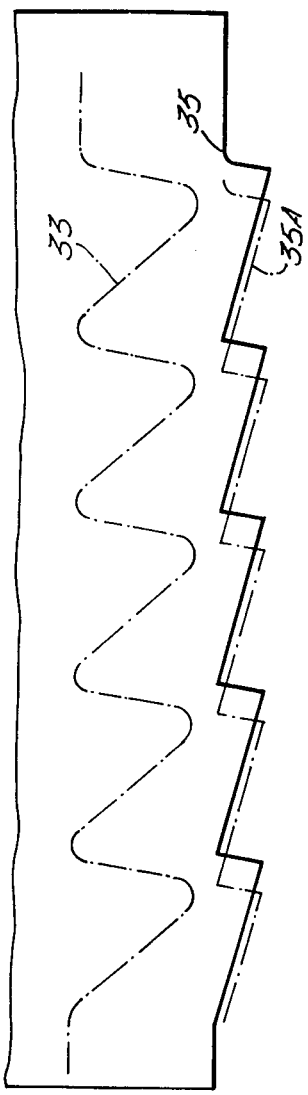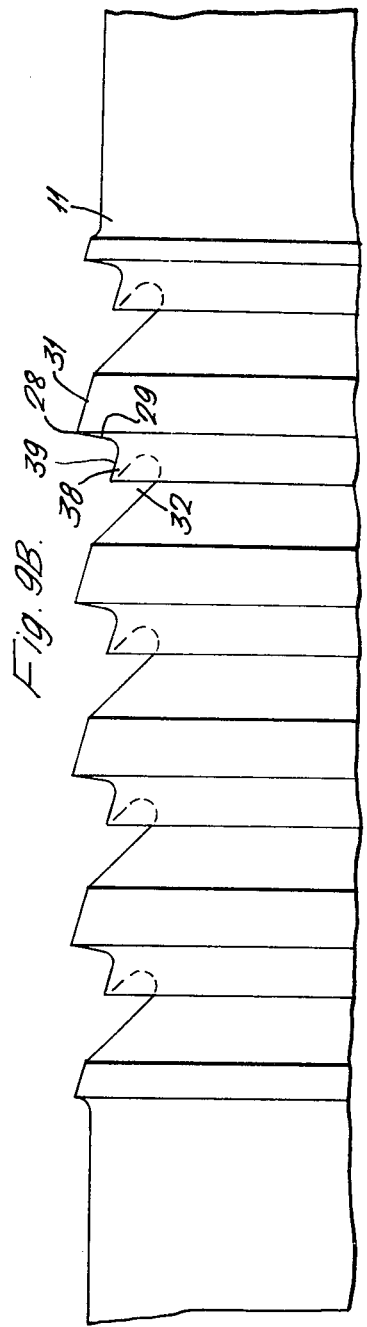

BARB AND METHOD OF MAKING SAME

This invention relates to an improved barb, and a method of making the improved barb. More particularly, the invention relates to a barb of circular symmetry for engagement with deformable material (e.g. for use in a mechanical fastener) which barb is formed by a rolling process. The invention also relates to the rolling process for making the barb.

One of the restrictions imposed by the rolling process is that it is necessary to roll down into a blank to a greater volume below the blank diameter than the volume of metal which can be thrown up above the blank diameter. This results in the production of a deep trough adjacent the barb, and this trough has the disadvantage that it allows too much deformation of the deformable material with which the barb is to be engaged.

The present invention seeks to overcome this problem.

The present invention provides, in one of its aspects, a barb of circular symmetry for engagement with deformable material, which barb is formed by a rolling process and comprises an outer edge for engaging with the deformable material, the edge being provided at the junction of a first face and a second face, the first face being relatively more steeply sloping than the second face;

a trough adjacent the aforesaid first face;

the trough containing an abutment radially intermediate in position between the outer edge of the barb and the root of the trough.

The invention provides, in another of its aspects, a barb of circular symmetry formed by a rolling process for engagement with deformable material to resist withdrawal therefrom, which barb comprises an outer edge for engaging with the deformable material and deflecting it radially inwardly on attempted withdrawal;

a trough on the side of the outer edge towards the direction of withdrawal for receiving deflected deformable material;

and an abutment positioned radially outwardly of the root of the trough for limiting the extent to which deformable material can enter the trough.

Preferably the trough has an annular face facing generally in the direction of withdrawal of the barb.

The invention provides, in another of its aspects, a barb of circular symmetry for engagement with deformable material, which barb is formed by a rolling process and comprises an outer edge and an annular face radially inwardly of the outer edge for engaging the deformable material on attempted withdrawal;

and an abutment radially intermediate the inner and outer edges of the annular face.

The invention provides, in another of its aspects, a barb of circular symmetry formed by a rolling process for engagement with deformable material to resist withdrawal therefrom, which barb comprises an outer edge for engaging the deformable material;

an annular face radially inwardly of the outer edge and facing generally in the direction of withdrawal;

and an abutment radially intermediate the inner and outer edges of the annular face.

The invention provides, in another of its aspects, a barb of circular symmetry formed by a rolling process for engagement with deformable material to resist withdrawal therefrom, which barb comprises an outer edge for engaging with and deflecting radially inwardly deformable material on attempted withdrawal of the barb therefrom;

an annular face radially inwardly of the outer edge and facing generally in the direction of withdrawal for abutment with deformable material deflected as aforesaid;

and an abutment radially intermediate the inner and outer edges of the annular face to limit the radially inward extent of deflection of deformable material to less than the full inwards radial extent of the face.

Preferably the abutment comprises a ledge projecting from the face.

The invention provides, in another of its aspects, a method of manufacturing a barb of circular symmetry by a rolling process, comprising the steps of rolling a radially projecting protuberance and a trough adjacent thereto which trough has a face adjacent the protuberance and thereafter rolling down part of the material adjacent the radially outer part of the face to form an abutment projecting from the face at a position radially outwardly of the root of the trough.

Preferably the method utilizes two rolling dies which could otherwise be used to manufacture by a multistage rolling process a similar barb without the abutment by applying the dies successively to a blank in predetermined relationship axially of the blank, and the method comprises the steps of applying the first rolling die to a blank to obtain a partly-formed blank, and thereafter applying the second rolling die to the partly-formed blank in a position displaced by a predetermined amount axially from the said predetermined relationship, to roll down part of the material as aforesaid.

The invention includes a barb of circular symmetry manufactured by a rolling process as aforesaid.

The invention also includes a member carrying at least one barb as aforesaid.

The invention also includes a member carrying a plurality of barbs as aforesaid.

The invention includes a member as aforesaid in combination with a body of deformable material into which the member can be inserted so that the barb or barbs resists or resist withdrawal therefrom.

The invention also includes a fastener comprising a first member as aforesaid in combination with a second member comprising a body of deformable material into which the first member can be inserted so that the barb or barbs resist or resists withdrawal of the first member therefrom.

A specific embodiment of the invention, in the form of a fastener having barbs according to and manufactured in accordance with the invention, will now be described by way of example and with reference to the accompanying drawings, in which:

FIGS. 3 and 4 show respectively, on an enlarged scale, the deformable material with prior art barbs engaged therein and after attempted withdrawal thereof;

Figure 10:
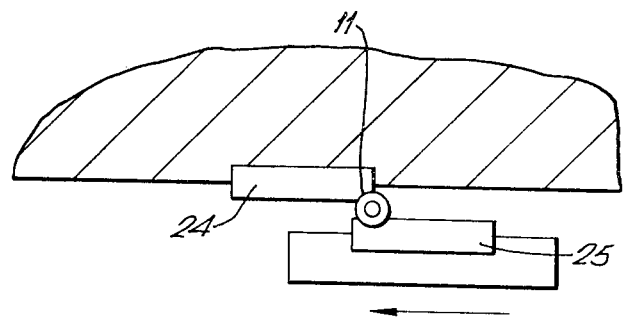
Figure 11:
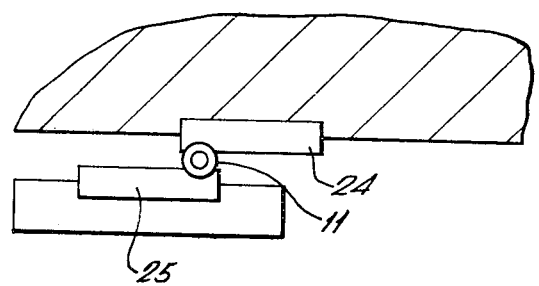

FIGS. 5 and 6 likewise show respectively the deformable material with the barbs of the present example engaged therein and after attempted withdrawal thereof;

FIG. 7 shows the shape of the first rolling die, and the partly formed blank produced thereby, common to both the prior art barbs and the barbs of the present example;

FIG. 8 likewise shows the shape and relative position of the second rolling die, and the barb form produced thereby, in manufacture of the prior art barbs;

FIG. 9 likewise shows the shape and displaced relative position of the same second rolling die, and the barb form produced thereby, in the manufacture of the barb of the present example;

FIGS. 10 and 11 illustrate schematically the manner of use of the rolling dies and blank in the method of manufacture of the present example.

By way of illustration of the invention, the barb form will be described applied to a particular form of fastener, but it will be understood that the barb is of wider application and can be used for other purposes.

Figure 1:
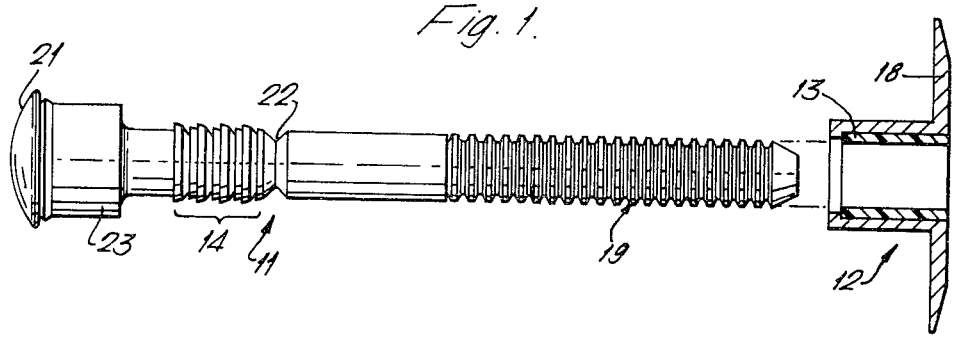
FIG. 1 is an elevation of the fastener before installation.

The fastener of this example illustrated in FIG. 1 comprises generally a pin member 11 of low-carbon steel and a tubular shell member 12 also of low-carbon steel. The shell carries a tubular slug 13 of nylon-66 material, which is deformable whilst still maintaining substantial mechanical strength.

The pin 11 carries a barbed section 14, the barbs of which can, when the pin is inserted into the shell, engage in the nylon slug to resist withdrawal of the pin from the shell. This fastener is intended to secure together two or more panels of suitable total thickness, in the way shown in FIG. 2. The pin 11 has been inserted from one side into a hole 15 drilled through two panels 16,17, until the enlarged head 21 of the pin contacts the nearer sheet 17. The shell 12 is then inserted over the tail end 19 of the pin. A suitable pulling tool is then applied to this projecting tail to push the shell into the hole in the sheet and over the barbed section 14 of the pin, until the enlarged head 18 of the shell contacts the sheet 16. The barbed section 14 has entered into the nylon slug 13 and the barbs have become embedded in it, as will be described in more detail below. Continued pulling on the pintail 19 by the tool breaks it off at a breaker groove 22 flush with or below the outer face of the head 18 of the shell.

The strength of the joint depends upon the security of engagement of the barbs in the nylon slug. It is thus desirable that the barbs offer the maximum resistance to withdrawal of the pin from the shell. At the same time, it is also desirable that the pin be manufactured as economically as possible. This means that, apart from the formation of the head 21 of the pin by forging or upsetting, and extrusion of the pintail portion 19 before formation of the grooves thereon, (and, in the particular design of pin of this example, the cylindrical part 23 immediately adjacent the head 21 being provided by a separate sleeve swaged on to the pin), the profile of the pin is preferably formed by a rolling process. This process is commonly known as "thread-rolling", since it is commonly used for making threaded screws or bolts. However, since in this example no threads are involved, the pin having circular symmetry, for the avoidance of confusion the process is herein referred to simply as "rolling". The rolling process is well known to those skilled in the art of mechanical production processes, and is illustrated schematically in outline only in FIGS. 10 and 11. It utilizes two dies, a fixed die 24 and a movable die 25. The movable die is reciprocated past the fixed die and cylindrical blank workpiece 26 is inserted between the dies at the start of each stroke as illustrated in FIG. 10. Generally face of each die carries in relief the complement of the profile it is desired to impress on the blank as the latter is rolled progressively between the dies until it emerges at the end of the working stroke as illustrated in FIG. 11. Although in practice a pair of opposed dies are used, in FIGS. 7A, 8A and 9A only one die of each pair is illustrated, it being understood that the other die, on the other side of the blank, is similar. If the rolling machine has a sufficiently long stroke, each die may comprise several different sections for acting successively on the blank, which is, other things being equal, more economical than performing two or more different rolling operations in successive passes in different rolling machines.

FIG. 8B illustrates on an enlarged scale the profile of the barbed portion of a prior art fastener of the type described above with reference to FIGS. 1 and 2. In this example there are five barbs 27, each comprising a sharp edge 28 at the junction of a first relatively steeply sloping face 29 (facing generally in the direction of withdrawal of the pin from the nylon slug—i.e. towards the left in FIG. 8B) and a second relatively less steeply sloping face 31 (facing generally in the direction of insertion of the pin into the nylon slug—i.e. towards the right in FIG. 8B).

Adjacent each steep face 29 is a trough 32. This trough is not necessary to the function of the barb (in fact it is a disadvantage which the present invention seeks to overcome), and its presence is due to restrictions introduced by the characteristics of the rolling process. In so far as they affect the present example, these restrictions are that (A) there are limits to the amount by which the configuration of the metal blank profile can be altered by any one rolling operation with a single pair of dies, and (B) in order to throw up a given volume of metal above the initial radius of a blank, it is necessary to roll down below the initial radius significantly more than that given volume of metal. Restriction (A) means that, in order to achieve the barb configuration of sharp edge 28 and sloping faces 29,31 shown in FIG. 8B, it is necessary to use two successive rolling operations using respectively die profiles shown in FIGS. 7A and 8A. Restriction (B) means that, in order for the first die 33 to throw up sufficient material into a protuberance 34 (FIG. 7B) for the second die 35 to successfully work on, the first die 33 has to roll down troughs 32 which are approximately twice as deep below the initial radius of the blank as the barbs project above the initial radius (i.e. the position of the surface 35 of the blank). These troughs, or at least their bottom parts, of course remain after the second rolling operation, as shown in FIG. 8B, and they are a disadvantage in use of the barbs, as is illustrated in FIGS. 3 and 4.

FIG. 3 shows the barbs engaged in the nylon slug 13, after they have been pulled into it. Since the maximum diameter of each barb at its sharp edge 28 is greater than the internal diameter of the nylon slug, each barb engages the nylon slug to the extent that the sharp edge 28, the shallow sloping face 31, and the outermost part of the steeply sloping face 29, are embedded in the nylon. The trough 32 in front of each steeply sloping face 29 is empty.

When force is applied to withdraw the pin 19 from the slug, in the direction of the arrow in FIG. 4, the sharp edge 28 of each barb cuts into the nylon, and this and the steeply sloping face 29 deflect part of the nylon down the face into the adjacent trough 32. This is illustrated in FIG. 4, which shows an annular tongue 36 of nylon material deflected down into the trough so as to form a cleavage 37 from the body of the slug. If the withdrawal force on the pin is increased, the tongues 36 will progressively bend and be deflected further down into the troughs 32, and will eventually be cut off by the advancing sharp edges 28, so that the barbs can then be withdrawn from the nylon slug at a much reduced pulling force.

In order to overcome this disadvantage the present inventors have appreciated that it is possible to limit the extent of deflection of the nylon material into the troughs by an abutment within the trough. The form which this abutment takes in the present example is illustrated in FIGS. 5, 6 and 9B.

This abutment is radially intermediate the inner edge of the face 29 (i.e. the bottom of the trough) and the outer edge of the face 29 (i.e. the sharp edge 28). In this example the abutment is provided by an annular ledge or rim 38, projecting from the steep face 29 of each barb and having an upper face 39 facing substantially radially outwardly but tilted slightly backwards towards the face 29. The ledge extends nearly halfway across the trough. FIG. 5 corresponds to FIG. 3 and shows the improved barbs engaged with the nylon slug, where the nylon is still only engaged by the tops of the barbs. FIG. 6 corresponds to FIG. 4 and illustrates how the nylon deforms under a pin withdrawal load similar to that applied in FIG. 4. It will be seen that the nylon material is deflected down the advancing steep face 29 of each barb until it meets the top face 39 of the ledge 38.

Further deflection of the nylon into the trough is restrained by the ledge, and the ledge supports the deflected part of the nylon material to make it act as a substantially stiff strut which resists further advance of the face 29 of the barb through the slug and hence resists further withdrawal of the barb. Although the part of the deflected nylon material between the ledge 38 and the next barb in front bulges slightly as indicated at 41, there is no cleavage of the deflected nylon material away from the main body of the nylon plug. As mentioned, FIG. 6 illustrates the same withdrawal load as FIG. 4.

Figure 2:
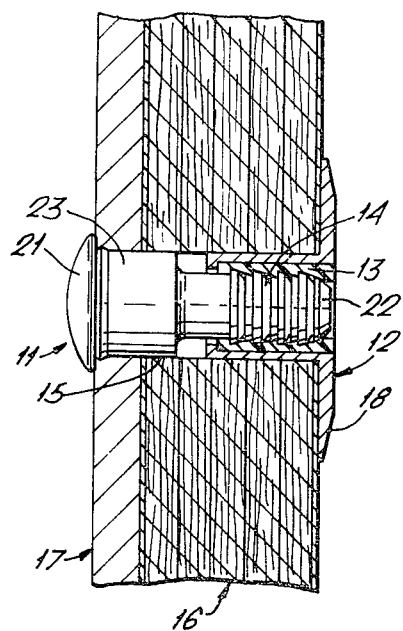
FIG. 2 is an elevation of the fastener after installation.

In both cases, the withdrawal load can be increased until the barbs break through the nylon and the pin can be withdrawn. The improvement in ultimate withdrawal load provided by the improved barb form illustrated in FIGS. 5, 6 and 9B, in a fastener pin and shell of the type illustrated in FIGS. 1 and 2, is illustrated by the following values:

|  | Old barb form (FIGS. 3 & 4) | New barb form (FIGS. 5 & 6) |
| --- | --- | --- |
| Installation load | 900 lbs force | 900 lbs force |
| Ultimate withdrawal load | 1,460 lbs force | 1,900 lbs force |

Thus the improved barb form provides an increase of 30% in the ultimate withdrawal load of the pin from the shell of the assembled fastener.

It is also found that the improved form of barb gives a stiffer engagement with the nylon slug: i.e. when the fastener is loaded axially to pull the pin and shell apart the actual displacement is less than with the prior art barb form at the same axial loading.

The present inventors have also devised a simple and economical method of rolling the improved barb form, which involves a simple modification of the method of rolling the old barb form.

In the two-stage rolling operation to obtain the old barb profile illustrated in FIG. 8B, the relationship between the two dies (axially of the pin and transversely of the die stroke) is shown in FIG. 8A, where the second die 35 is shown in full lines and the corresponding position of the first die 33 is shown in broken lines, both these dies being shown in the appropriate relationship to the finished barb form in FIG. 8B. It will be seen that the steeply sloping faces 42 of the first die and 43 of the second die are substantially in alignment. It will also be seen that the second die 35 does not extend entirely to the base of the trough 32.

Figure 7A:
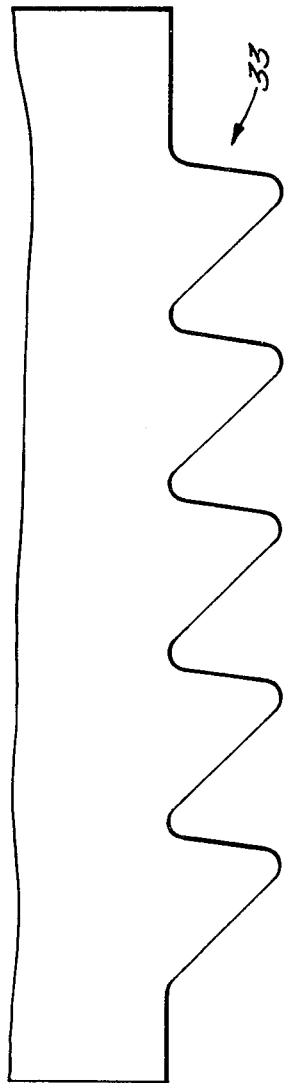
Figure 7B:
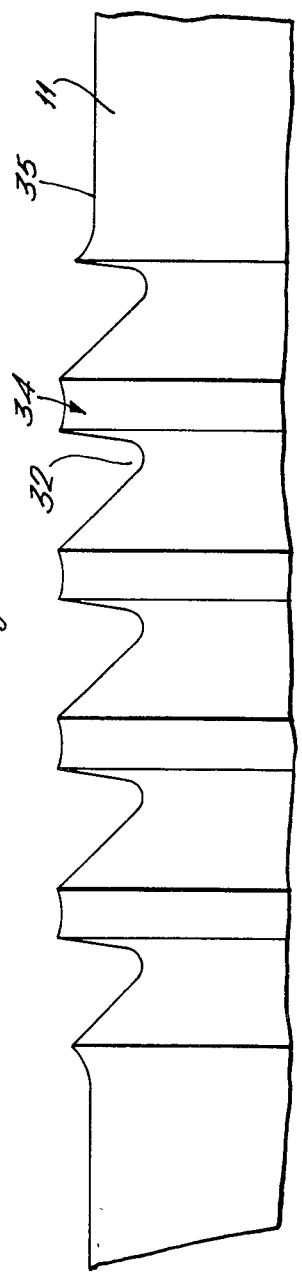

In the rolling of the improved barb form the first die is the same as in the case of the old barb form, as shown in FIG. 7A, and is applied to the blank in the same way to obtain the same partly formed blank shown in FIG. 7B. The second die is also of the same form as in the rolling of the old barb form but is applied to the partly formed blank in a different position axially of the blank. In other words, the predetermined relationship between the two dies is altered.

This is illustrated in FIGS. 9A and 9B, where the position of the first die 33 is shown in broken lines, the position of the second die 35 in the present method is shown in full lines, and the relative position of the first die in the method of rolling the old barb form is shown in broken lines at 35A. All these die positions (as far as position axially along the pin and transversely of the die stroke is concerned) are also shown relative to the finished barb form in FIG. 9B. It will be seen that the predetermined relationship of the second die and the first die has been altered to a predetermined extent, by displacing the second die slightly in the direction in which the barbs will ultimately be inserted in the nylon slug, i.e. towards the shallow sloping face 31 of each barb. The second die thus rolls down part of the material of the partly formed barb 34 in FIG. 7B to form the ledge 38. It will be seen that the second die 35 does not extend entirely to the base of the trough 32.

Both the first and second dies are preferably accommodated in the same die rolling machine so that the rolling operations are completed at a single pass through the rolling machine, but they could of course be applied in separate rolling operations.

The invention is not restricted to the details of the foregoing example.

For instance, although the barb has been described as applied to a member for use in a fastener of a particular type, the barb can also be applied to other uses. Although, in the example described, five barbs are used, a greater or lesser number may alternatively be used. For some purposes a single barb may be sufficient; a fastener of the type described may have, for example, from one to six barbs.

The form of the abutment in the trough may be different from that described in the foregoing example.

The term "barb of circular symmetry" used in the consistory clauses and claims herein includes a barb of substantially circular symmetry which has been manufactured by rolling. For instance, a barb according to the invention might have longitudinal grooves formed in it, e.g. by a crimping operation performed after the rolling operation.

What we claim is:

1. A barb of circular symmetry for engagement with deformable material, which barb is formed by a rolling process and comprises:
   a radially outermost edge for engaging with the deformable material, the edge being provided at the junction of a first face and a second face, the first face being relatively more steeply sloping than the second face;

a trough adjacent the aforesaid first face;

the trough containing an abutment projecting from the aforesaid first face and radially intermediate in position between the radially outermost edge of the barb and the root of the trough.

2. A barb of circular symmetry formed by a rolling process for engagement with deformable material to resist withdrawal therefrom, which barb comprises:

a radially outermost edge for engaging with the deformable material and deflecting it radially inwardly on attempted withdrawal;

a trough on the side of the outer edge towards the direction of withdrawal for receiving deflected deformable material;

and an abutment positioned between the root of the trough and the aforesaid radially outermost edge and radially outwardly of the root of the trough for limiting the extent to which deformable material can enter the trough.

3. A barb of circular symmetry formed by a rolling process for engagement with deformable material to resist withdrawal therefrom, which barb comprises:

radially outermost edge for engaging the deformable material;

an annular face radially inwardly of the radially outermost edge and facing generally in the direction of withdrawal;

and an abutment projecting from the aforesaid annular face and radially intermediate the inner and outer edges of the annular face.

4. A barb of circular symmetry formed by a rolling process for engagement with deformable material to resist withdrawal therefrom, which barb comprises:

a radially outermost edge for engaging with and deflecting radially inwardly deformable material on attempted withdrawal of the barb therefrom;

an annular face radially inwardly of the radially outermost edge and facing generally in the direction of withdrawal for abutment with said deflected deformable material;

and an abutment projecting from the aforesaid annular face and radially intermediate the inner and outer edges of the annular face to limit the radially inward extent of deflection of deformable material to less than the full inwards radial extent of the face.

5. A barb as claimed in claims 1, 2, 3 or 4 which the abutment comprises a ledge.

6. A method of manufacturing a barb of circular symmetry by a rolling process, comprising the steps of rolling a radially outermost projecting protruberance and a trough adjacent thereto which trough has a face adjacent the protruberance, and thereafter rolling down part of the material adjacent the radially outer part of the face by means of a die which does not contact the radially innermost part of the trough to form an abutment projecting from the face at a position radially outwardly of the root of the trough.

7. A method of manufacturing a barb of circular symmetry by a rolling process, comprising the steps of rolling by means of a first die a radially outermost projecting protruberance and a trough adjacent thereto which trough has a face adjacent the protruberance, and thereafter rolling down by means of a second die part of the material adjacent the radially outer part of the face to form an abutment projecting from the face at a position radially outwardly from the root of the trough, wherein the two rolling dies could otherwise be used to manufacture by a multistage rolling process a similar barb without an abutment by applying the dies successively to a blank in predetermined relationship with each other axially of the blank, in which method the second rolling die is applied to the partly formed blank in a position displaced by a predetermined amount axially from said predetermined relationship with the first die, to roll down part of the material to form said abutment.

8. A barb of circular symmetry manufactured by a rolling process as claimed in claim 6 or claim 7.

9. A member carrying at least one barb as claimed in claims 1, 2, 3, 4, 5 or 8.

10. A member carrying a plurality of said barbs as claimed in claims 1, 2, 3 or 4.

11. A fastener comprising a first member as claimed in claim 10, in combination with a second member comprising a body of deformable material into which the first member can be inserted so that said barbs resist withdrawal of the first member therefrom.

12. A member carrying at least one barb as claimed in claim 8.

13. A member carrying a plurality of barbs as claimed in claim 8.

14. A fastener comprising a first member as claimed in claim 13, in combination with a second member comprising a body of deformable material into which the first member can be inserted so that said barbs resist withdrawal of the first member therefrom.

* * * * *